Figure 7:
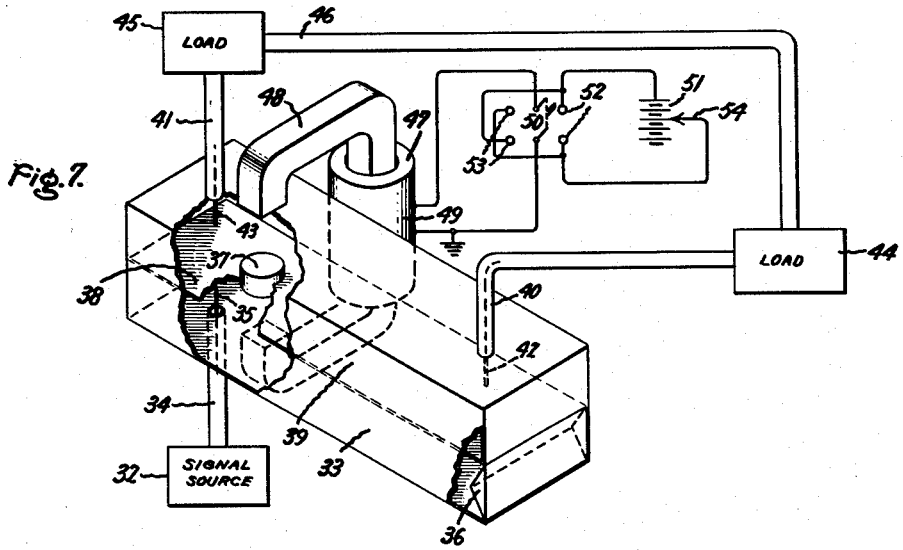

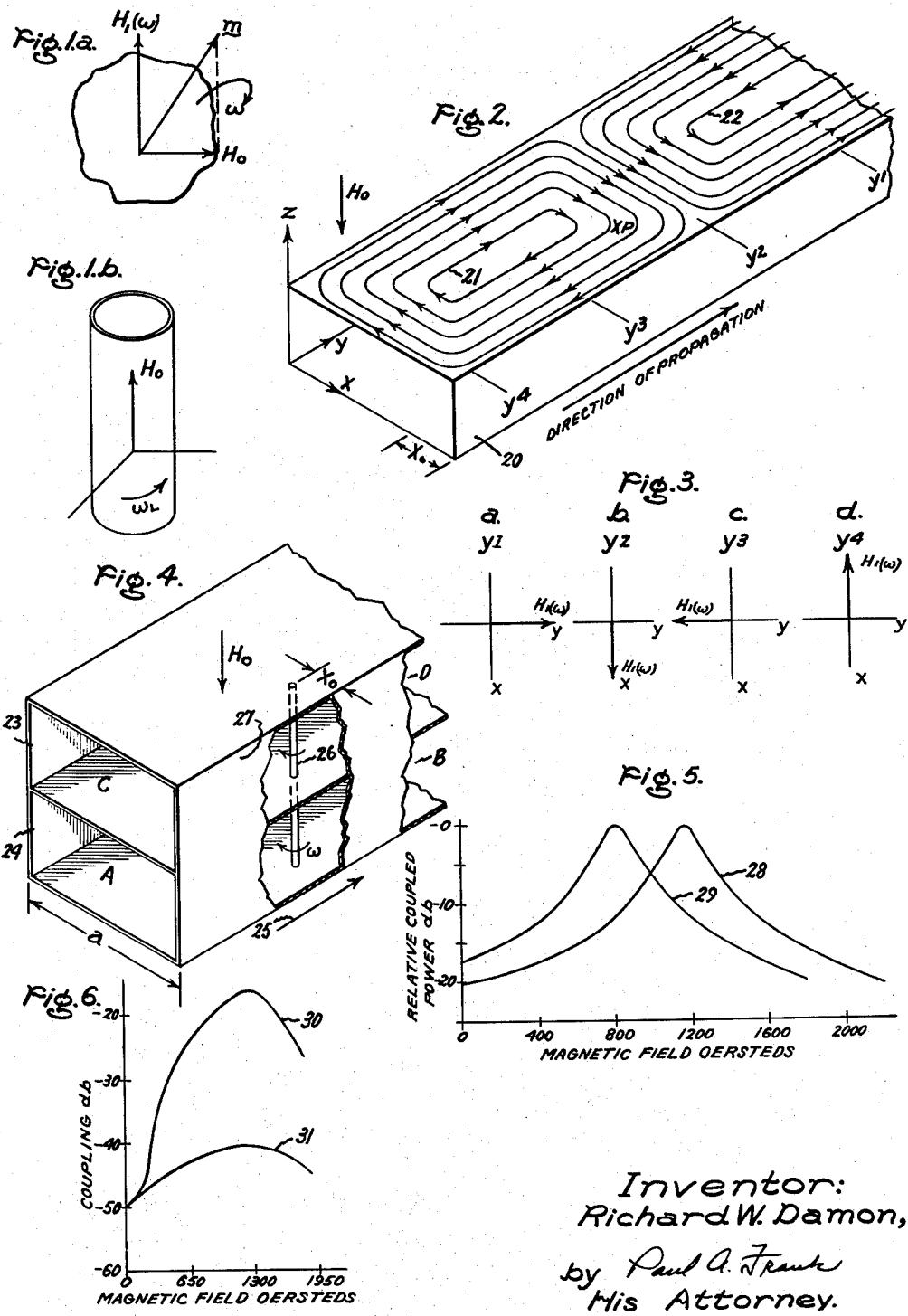
Inventor:
Richard W. Damon,
by Paul A. Frank
His Attorney.

Dec. 31, 1963  R. W. DAMON  3,116,467
DIRECTIONAL COUPLER BETWEEN ADJACENT WAVEGUIDE VIA
A CENTRALLY DISPLACED NON-RECIPROCAL
GYROMAGNETIC COUPLING ROD
Filed March 17, 1955  2 Sheets-Sheet 2

Inventor:
Richard W. Damon,
by Paul A. Frank
His Attorney.

United States Patent Office 3,116,467
Patented Dec. 31, 1963

---

3,116,467
DIRECTIONAL COUPLER BETWEEN ADJACENT WAVEGUIDE VIA A CENTRALLY DISPLACED NON-RECIPROCAL GYROMAGNETIC COUPLING ROD
Richard W. Damon, Schenectady, N.Y., assignor to General Electric Company, a corporation of New York
Filed Mar. 17, 1955, Ser. No. 494,921
4 Claims. (Cl. 333—1.1)

This invention is directed to an apparatus for coupling electromagnetic wave energy. While this invention is subject to a large number of modifications and variations it is suited for coupling electromagnetic wave energy between wave guides and is particularly described in this connection.

It is known that electromagnetic wave energy can be coupled between transmission systems such as waveguides by means of interconnecting slots or holes. If the holes are properly spaced, electromagnetic wave energy associated with a forward direction of propagation is coupled whereas electromagnetic wave energy associated with a backward direction of propagation is not coupled. Such directional couplers are frequency sensitive and the degree of coupling is not easily controlled.

Other devices for selective and/or directional coupling utilize apparatus which rotates the polarization of the electric field of the propagated wave. Polarization rotation devices require relatively complicated associated transmission systems.

It is apparent that a coupler which is highly directional and provides a convenient means for varying the degree of directivity, coupling and frequency passband would be particularly desirable for utilization in electromagnetic wave energy transmission systems. Therefore, it is an object of this invention to provide an improved method and apparatus for coupling electromagnetic wave energy.

It is also an object of this invention to provide an improved apparatus for controlling the direction and degree of coupling electromagnetic wave energy.

Another object of this invention is to provide an improved apparatus for modulating the degree of coupling of electromagnetic wave energy.

According to an aspect of this invention there is provided a coupler comprising a plurality of electromagnetic wave energy transmission means. At least one member including ferromagnetic material is coupled between the wave energy transmission means and projects into the magnetic fields associated with an electromagnetic wave propagated by the transmission means. A polarized magnetic field is caused to link the member whereby electromagnetic wave energy is coupled between the transmission means. The direction of polarization of the magnetic field determines the direction of propagation of the electromagnetic wave energy which is coupled between the systems and the strength of the polarized magnetic field determines the resonant frequency of the coupler and the degree of coupling.

Figure 8:
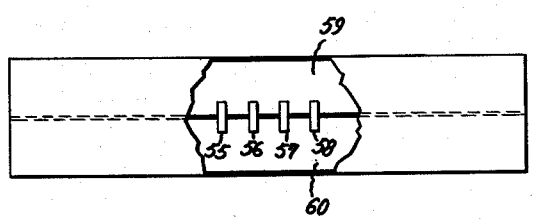
Figure 9:
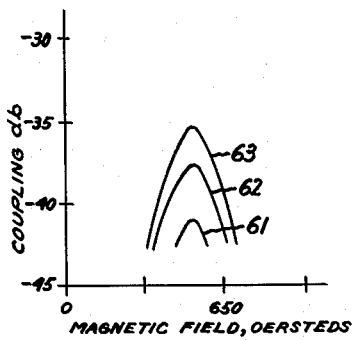
Figure 10:
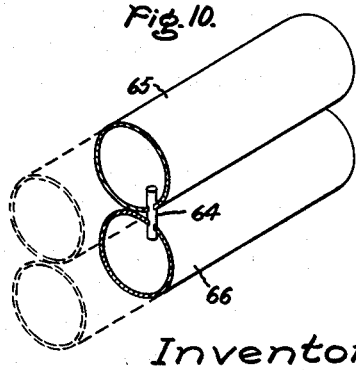

The other objects and important aspects of this invention will become apparent from the following specification and claims when taken with the figures of the drawing in which FIGURES 1 through 6, inclusive, illustrate diagrams useful in describing this invention; FIGURE 7 illustrates a specific embodiment of an electromagnetic wave energy transmission system incorporating the practice of this invention; FIGURE 8 illustrates another embodiment incorporating the practice of this invention; FIGURE 9 illustrates a diagram useful in explaining the operation of the embodiment illustrated in FIGURE 8 and FIGURE 10 illustrates another exemplary embodiment of this invention.

A directional coupler is a device for sampling the electromagnetic wave energy propagated in one direction in an electromagnetic wave transmission system, hereinafter referred to as a wave guide, and coupling it into a second wave guide substantially independently of any electromagnetic wave energy propagated in the opposite direction. That is, substantially no energy propagated in the opposite direction is coupled.

Previously known directional couplers accomplish this by using suitably shaped and spaced coupling holes between the wave guides. The coupling directivity and pass bandwidth are determined by these geometric factors, which once established in the fabrication of the electromagnetic wave system, are not easily modified.

By utilizing the phenomena of ferromagnetic resonance in a member including ferromagnetic material, directional coupling can be obtained. The degree and direction of coupling can be controlled by controlling the strength and polarization of a magnetic field linking the ferromagnetic member. Variations in the magnetic field strength can be utilized for modulating the coupled power, i.e. effectively amplitude modulating the coupled power, or to accommodate changes in operating frequency since the resonant frequency of the ferromagnetic coupling member is affected by the intensity of the polarized magnetic field.

Thus, it is possible in the practice of this invention to obtain, for example, non-reciprocal circuits and/or circuit elements which can be used as load isolators, directional attenuators, modulators and switches.

While coupling in accordance with this invention may utilize any compound or material in which magnetic resonance may be observed, it is particularly described in connection with the general class of ferromagnetic materials defined as ferrites which are represented by the chemical formula $MO \cdot Fe_2O_3$, where M is a divalent metal ion such as Mn, Co, Ni, Cu, Mg, Zn, Cd or a mixture of one or more of these metals. These couplers may include a small portion of or be entirely composed of ferromagnetic material.

In order to obtain a better understanding of the phenomena associated with the practice of this invention and in particular the phenomena of ferromagnetic resonance, attention is directed to FIGURE 1a which shows a mass of ferromagnetic material and vectors $H_0$, $$\underset{\sim}{m} \text{ and } H_1(\omega)$$

and $H_1(\omega)$. For the purposes of this explanation, it is assumed that a sample of ferromagnetic material is placed in a static unidirectional magnetic field having flux lines polarized in a direction of vector $H_0$. Due to the contribution of the many spinning electrons in the sample, it has a magnetic moment. The total magnetization vector $\underset{\sim}{m}$ has associated with it an angular momentum arising from the angular momenta of all of the spinning electrons contributing to the magnetization.

Because of this angular momentum the magnetization vector behaves as a top or gyroscope. If it is displaced from its equilibrium position in a static unidirectional magnetic field, it will not rotate directly into alignment with the field but will precess in a particular direction about the static unidirectional magnetic field direction at an angular frequency $\omega_L$. The frequency $\omega_L$ is determined by a number of factors including the strength of the unidirectional magnetic field $H_0$. In the absence of damping, this precession would continue indefinitely, but damping losses in most ferrites are such that precessing is damped in approximately $10^{-8}$ seconds.

If an oscillating magnetic field $H_1(\omega)$ is applied at right angles to the unidirectional magnetic field $H_0$, the magnetization vector is driven in precession. When the driving frequency $\omega$ is equal to the natural precessional frequency, energy is absorbed from the electromagnetic field.

Since a considerable amount of damping is present, resonance is not sharply defined at a particular frequency but is defined by a relatively broad curve over the frequency range. Typical values of Q, where Q is defined as $f/\Delta f$ at the half power points of the resonant curve, for some classes of ferrite compositions are of the order of 10. If, in addition, the oscillating magnetic field is circularly polarized in a plane substantially perpendicular to the static magnetic field in the ferrite, there is a transfer of energy for only one particular sense of rotation of the $H_1(\omega)$ vector. For the opposite sense of rotation, there is substantially no coupling and consequently no resonant excitation of the ferrite, i.e. energy is absorbed and the ferromagnetic member excited when a circularly polarized magnetic field component is present which is rotating in the direction of natural precession of the magnetization vector.

FIGURE 1(b) illustrates a manner of determining the direction of circular polarization of a magnetic field component which will result in coupling to a ferrite member. The natural direction of precession can be determined by placing the right hand about the sample with the thumb of the right hand pointing in the direction of the polarized magnetic field $H_0$. The direction of natural precession, illustrated by the arrow $\omega_L$ is determined by the direction in which the fingers of the hand curl about the sample.

The use of ferromagnetic materials in wave guides can be understood by reference to the illustration of FIGURE 2. This figure shows, diagrammatically, the magnetic field distribution associated with a rectangular wave guide 20 in which an electromagnetic wave is propagated, for example in the $TE_{01}$ mode. At an instant of time there will be present an electromagnetic field having a magnetic field distribution and polarization as illustrated by the directional arrows which form closed loops 21 and a second group with similarly closed loops 22. If a ferromagnetic member is placed in the region P, it will be subjected to an electromagnetic field which includes a magnetic field component which is circularly polarized.

That there is such a circularly polarized magnetic field present is apparent if the action which takes place is considered for one wave guide wave length. Although the field moves in the indicated direction of propagation and point P remains fixed, it can be assumed for purposes of this description, that point P moves in a direction opposite to the direction of propagation and is successively in a field corresponding to the instantaneous fields present at positions $y_1$–$y_4$ during one period. At position $y_1$ a sample of material at point P is subjected to a magnetic field substantially in the $+y$ direction as illustrated in FIGURE 3(a).

At position $y_2$ the sample is subjected to a magnetic field in the $+x$ direction as illustrated in FIGURE 3(b). One quarter of a wave guide wave length later at position $y_3$ the sample is subjected to a magnetic field in the $-y$ direction and in a similar manner, at position $y_4$, to a magnetic field in the $-x$ direction as illustrated in FIGURES 3(c) and 3(d), respectively.

Therefore, it is apparent that a magnetic field, including a circularly polarized component, exists in the region designated P of a rectangular wave guide in which an electromagnetic wave in the $TE_{01}$ mode is propagated. It is also apparent that the direction of rotation of circularly polarized magnetic field is reversed if the region P is on the other side of the center line of the wave guide 20.

Thus, ferromagnetic resonance is obtainable for a wave propagated in a first direction with substantially no ferromagnetic resonance for a wave propagated in the opposite direction. It can be shown that circularly polarized magnetic field components exist in transmission systems having other configurations and operated in other modes.

In order to have coupling to a ferromagnetic sample placed at point P it is necessary to have a polarized auxiliary magnetic field in the direction illustrated by the vector $H_0$. If the polarization of the auxiliary magnetic field or the direction of propagation is reversed there will be substantially no coupling to a ferromagnetic sample at point P.

Under optimum conditions in a rectangular wave guide it is possible to determine the position P for the sample, at which there is a circularly polarized component of the magnetic field associated with an electromagnetic wave propagated along the guide. This position is determined from the theoretical magnetic field configuration in the wave guide. With the dominant $TE_{01}$ mode, this region measured from one wall of the guide is at a position which may be shown to be defined by the equation $$X_0 = a\, \cot^{-1} \sqrt{1-(\lambda/2a)^2} \qquad (1)$$

where $a$ is the width of the guide and $\lambda$ is the free space wave length of the electromagnetic wave energy being propagated down the guide. By placing a ferromagnetic sample at a distance $x_0$ from one of the narrow walls of the wave guide directional coupling is obtainable. It should be noted that the presence of ferromagnetic material in a wave guide alters the value of $X_0$ calculated from Equation 1.

FIGURE 4 illustrates an explanatory embodiment of this invention wherein there are illustrated two wave guide members 23 and 24. It is assumed that an electromagnetic wave is propagated through wave guide 24 in a direction as indicated by arrow 25 and that a rod 26 of ferrite material, located a distance $x_0$ from the narrow side wall 27, projects into guide 23 and into guide 24 and that the distance $x_0$ is selected so that a magnetic field having a circularly polarized component rotating in the direction $\omega$ will be present when electromagnetic wave energy is propagated down wave guide 24. A magnetic field polarized in the direction of the arrow $H_0$ is caused to link the ferromagnetic coupler 26 and is of such strength that the ferromagnetic sample has a resonant peak near the operating frequency of the system.

The magnetization vector of ferromagnetic member 26 precesses at an angular velocity $\omega$ which is substantially resonant with the circularly polarized magnetic field associated with the wave energy propagated along guide 24. Ferromagnetic resonance is also established in the portion of coupler 26 which is oriented in the waveguide 23. This portion of coupler 26 acts as a magnetic dipole and excites an electromagnetic wave in wave guide 23 which includes a magnetic field component which is circularly polarized and rotating in the same direction as in wave guide 24.

Since coupler 26 is also located a distance $x_0$ from the side wall of wave guide 23 electromagnetic wave energy is propagated in wave guide 23 in the direction of arrow 25 only. Wave energy propagated in an opposite direction in either wave guide has a circularly polarized magnetic field component with the wrong direction of rotation so that there is substantially no coupling of electromagnetic wave energy between the wave guides.

Therefore, it is apparent that there is provided a means for directionally coupling electromagnetic wave energy between the two guides. It is noted that the coupling is proportional to the square of the magnetic moment and is thus proportional to the square of the volume of the coupling member of ferromagnetic material 26. FIGURE 4 may be considered as a four terminal network with terminal A at one end of guide 24 and terminal B at the other end of guide 24 with terminal C at the front end of guide 23 and terminal D at the other end of guide 23. With auxiliary magnetic field $H_0$ polarized as illustrated, electromagnetic wave energy can be coupled from terminal A through coupler 26 to terminal D only and substantially no energy can be transferred from terminal B through coupler 26 to terminal C. The apparatus illustrated in FIGURE 4 can be modified so that coupler 26 enters guide 23 at the approximate center thereof and acts as an omnidirectional exciting probe so that electromagnetic wave energy is propagated in both directions in guide 23.

If a reflective load is placed at terminal B only that energy which is traveling from A toward B is coupled into guide 23 and substantially none of the reflected wave energy traveling from B toward A is coupled into wave guide 23. If the direction of magnetic field $H_0$ is reversed, only electromagnetic wave energy traveling from terminal B toward terminal A is coupled to waveguide 23. In addition by switching or modulating the magnitude and/or direction of magnetic field $H_0$ it is apparent that the ferromagnetic coupler 26 can function as an amplitude modulating coupler or as a selector switch to alternately select energy from terminals A and B.

FIGURE 5 illustrates exemplary coupling curves for a typical ferrite material. Curve 28, for example, is representative of conditions obtaining with an electromagnetic wave of the order of 9,000 megacycles per second and curve 29 is representative of conditions obtaining with electromagnetic wave energy of the order of 8,000 megacycles per second. The ordinate of this curve is the relative power in decibels coupled by the ferromagnetic material and the abscissa is the polarized auxiliary magnetic field strength.

From this curve it is apparent that, with a fixed magnetic field, the bandwidth is determined by the width of the ferromagnetic resonance of the coupler member and by the frequency dependence of the dimension $x_0$. It is also apparent from this curve, that the inherent resonance can be compensated by adjusting the magnetic field as the frequency is changed. At 8,000 megacycles per second it is apparent that a peak resonance and therefore maximum power transfer between the wave guides is obtained with a magnetic field strength of the order of approximately 800 oersteds while approximately 1200 oersteds is required at 9,000 megacycles per second. The precise value of magnetic field and the frequency dependence of the field required for resonance depends on the magnetic properties and the geometric shape of the ferromagnetic sample.

It is also noted that in a ½ inch x 1 inch waveguide operating at approximately 9000 megacycles per second center frequency the dimension $x_0$ changes ±0.020 inch for a frequency bandwidth of the order of 2000 megacycles per second. Thus, the centering of a coupler including ferromagnetic material is not particularly critical with respect to bandwidth.

FIGURE 6 illustrates the directional coupling obtainable in the practice of this invention. For example, curve 30 illustrates the relative coupling for a forward propagated electromagnetic wave and 31 illustrates the coupling for a backward propagated electromagnetic wave. The ferromagnetic resonance peak and the directional coupling effect are apparent from these curves. At zero or very low values of magnetic field, it is noted that there is substantially no directional coupling. It should be appreciated by those skilled in the art that the illustrated directivity is only representative and that by proper selection of size, number and length of the ferromagnetic coupling members any desired degree of directional coupling is obtainable.

FIGURE 7 illustrates an example of a test system incorporating the practice of this invention. Electromagnetic wave energy from signal source 32 excites waveguide 33 through coaxial line 34 and probe 35 so that an electromagnetic wave is propagated along guide 33 toward calibrated load 36 which may be of any conventional form such as a dielectric wedge placed in the end of the wave guide 33. By way of example, this wedge may be designed to establish a standing wave ratio of the order of 1.2 in guide 33. A member 37 including ferromagnetic material and having approximate dimension of 140 mils in diameter by approximately 317 mils in length is inserted in a hole in the partition 38 between wave guides 33 and 39. For example, the ferromagnetic material may consist of a nickel zinc ferrite with a small amount of vanadium oxide added and having an approximate chemical composition of 48.0 mol percent $Fe_2O_3$, 26.5 mol percent NiO, 25.0 mol percent ZnO and 0.5 mol percent $V_2O_5$.

Output coupling leads 40 and 41 are provided in the ends of guide 39 and may consist of conventional coaxial leads having center probes 42 and 43 respectively inserted in the guide 39. Coaxial lead 40 is coupled to an unknown load 44. Unknown load 44 is coupled to an indicating receiver 45 through transmission system 46 which may consist of a coaxial line. Coaxial lead 41 is also coupled to indicating receiver 45. In order to provide the polarized magnetic field necessary to obtain ferromagnetic resonance in the coupler 37, a solenoid 47 is provided. This solenoid has a core 48 and is wound with coil 49 one end of which is grounded and the other end of which is connected to switch member 50. Power supply 51 provides power to contacts 52 and 53 so that the direction of the magnetic field can be changed by moving switch member 50 from contacts 52 to contacts 53. The power supply has a variable output which is controlled by contact arm 54. Thus, the resonant frequency and degree of coupling of coupler 37 can be varied in accordance with a desired modulating signal.

In operation, a signal from source 32, for example, of the order of 9000 megacycles, is propagated down guide 33 toward the calibrated load 36. Solenoid 47 is adjusted so that electromagnetic wave energy traveling toward load 36 is coupled to wave guide 39 through ferromagnetic coupler 37 and so that substantially no electromagnetic energy traveling from load 36 is coupled to wave guide 39. Coupled signal energy travels down from guide 39 to pickup probe 42, through unknown load 44 to receiver 45.

In order to calibrate receiver 45, the direction of the magnetic field is reversed so that substantially none of the energy coming directly from signal source 32 is coupled by coupler 37 and so that energy from the calibrated load 34 is coupled to wave guide 39 and travels toward pickup probe 43 and into receiver 45. Switching of electromagnetic wave energy is easily and conveniently carried out by switching the magnetization power supply 51. Since the standing wave ratio of calibrated load 36 is known, it is possible to calibrate receiver 41 so that it will give a relative indication of the magnitude and characteristics of unknown load 44.

It will readily be appreciated by those skilled in the art that this is merely an exemplary embodiment of this invention. For example, load 44 can be an impedance bridge such as a hybrid T with a two terminal device to be tested in one arm of the T. Parts of the illustrated apparatus can be modified to provide a modulator, an antenna switching device or other systems in which it is desired to have a convenient means of controlling the frequency, amplitude, and direction of coupling of electromagnetic wave energy.

In some applications it may be advantageous to obtain greater directivity than that obtainable with a single directional coupler by utilizing smaller diameter couplers. For example, a system may incorporate a longitudinal array of couplers 55, 56, 57 and 58 all at a distance $x_0$ from the guide walls of wave guides 59 and 60, as illustrated in FIGURE 8. In addition, by placing the samples approximately ¼ of a wave guide wave length apart, increased directivity can be obtained.

It should be noted that the coupling power decreases approximately as the fourth power of the coupler diameter (since the coupling varies as the square of the volume) and increases approximately linearly with the number of couplers, therefore, although the directivity of the coupler is greatly enhanced by utilizing small diameter couplers it may be necessary to use a plurality of couplers in order to obtain a high degree of coupling.

FIGURE 9 illustrates an exemplary plot of the coupling in terms of negative decibels with respect to the magnetic field in oersteds. Curve 61 illustrates the coupling obtained with a single ferromagnetic coupling member. Curve 62 illustrates that obtainable with three coupling members and curve 63 illustrates that obtainable with five coupling members. By way of example, these curves are obtainable with an array of 44 mil diameter, one inch long couplers of ferromagnetic material of the previously described specific composition and at an operating frequency of 8400 megacycles per second. These ferromagnetic members were spaced ¼ of an inch apart longitudinally and all half way from the narrow wall to the center of the guide (this is an approximation of the theoretically desirable spacing $x_0$). Thus, it is apparent that very highly directive coupling effects are obtainable and that small diameter couplers exhibit relatively sharp resonant peaks. In addition, the utilization of couplers in accordance with this invention results in low voltage standing wave ratios; for example, ratios of less than 1.1 over a wide range of field strengths are obtainable.

In the dominant $TE_{01}$ mode, in a circular guide, circularly polarized magnetic field components occur in a region displaced from the center of the guide. FIGURE 10 illustrates the utilization of a coupler 64, between circular wave guide transmission systems 65 and 66.

It is noted that the ferromagnetic members which act as directional couplers may have any degree of insertion into the two wave guides as determined by the particular parameters of the wave guide system utilized. Since the conductivity of most ferrites is extremely low, i.e. of the order of $10^{-6}$ to $10^{-12}$ reciprocal ohm-centimeters, the members can extend entirely across the wave guide with substantially no adverse effects. For other applications it may be desirable for the ferromagnetic member to project only a short distance into each of the wave guide members or to form a plug between the wave guides with surfaces substantially flush with the common wave guide walls. In addition, it should be noted that the auxiliary magnetic field can be modulated conveniently by an auxiliary signal source so as to modulate the degree of coupling at an audio or radio frequency rate. For example, a modulator can be substituted for the power supply switch illustrated in FIGURE 7.

It is readily apparent that there are a wide variety of ferromagnetic materials, such as the large class of ferrites, which may be utilized in the practice of this invention without departing therefrom and that this invention may be practiced in combination with any electromagnetic wave transmission device. The coupling and directivity can be modified by variations in coupler position, diameter and composition and by the use of various combinations and arrays of coupling elements. That is, by variation of the materials utilized and the geometry of the coupling member and electromagnetic wave transmission system, the desired degree of directivity and power transfer is obtainable.

Therefore, it is apparent that this invention can be incorporated in any apparatus wherein there is a circularly polarized magnetic field component of the electromagnetic field established by a propagated electromagnetic wave which can be effectively coupled to a member in which magnetic resonance obtains.

While this invention has been described in connection with a limited number of exemplary embodiments it will be readily apparent to those skilled in the art that it is subject to a wide variety of modifications and variations and it is intended in the appended claims, to cover all modifications and variations coming within the true spirit and scope of this invention.

What I intend to claim and protect by Letters Patent of the United States is:

1. An electromagnetic device comprising a main rectangular waveguiding structure for propagating an electromagnetic wave; a thin elongated ferrite rod disposed transversely through a matching aperture in at least one broad side of said main waveguiding structure intermediate the center line and one side thereof to extend into said main waveguiding structure, a substantial portion of the length of said ferrite rod being external to said main waveguiding structure; an auxiliary waveguiding structure being disposed about the portion of said ferrite rod external to said main waveguiding structure, wherein said ferrite rod projects through a matching aperture in one broad side of and into said auxiliary waveguiding structure intermediate the center line and one side thereof; and means for maintaining a direct current magnetic field lengthwise through said ferrite rod of an intensity to produce gyro-resonance at a frequency substantially equal to the frequency of said electromagnetic wave, whereby a wave corresponding to said electromagnetic wave is launched in a single direction in said auxiliary waveguiding structure.

2. A directional electromagnetic coupler comprising a pair of elongated waveguide structures of rectangular cross-section each capable of transmitting electromagnetic wave energy in the $TE_{01}$ mode supported with the longitudinal axes thereof parallel and with the adjacent broad side walls thereof parallel and overlapping, an opening through the adjacent broad side walls located between the center line and one narrow side wall of each of said waveguides and in a region of circular polarization of the magnetic field of an electromagnetic wave of the $TE_{01}$ mode in said waveguides, a ferrite type coupling member exhibiting the gyromagnetic effect positioned in said opening and exposed to the interior of both of said waveguides, means maintaining a polarizing magnetic field through said coupling means of an intensity to produce gyromagnetic resonance of said coupling member at substantially the frequency of the electromagnetic wave to be propagated to produce coupling between said coupling member and an electromagnetic wave of the $TE_{01}$ mode in either of said waveguides dependent upon the direction of the polarizing magnetic field and the direction of rotation of the circularly polarized field of said waveguides.

3. A directional electromagnetic coupler comprising a pair of elongated waveguide structures of rectangular cross-section each capable of transmitting electromagnetic wave energy in the $TE_{01}$ mode supported with the longitudinal axes thereof parallel and with the adjacent broad side walls thereof parallel and overlapping, an opening through the adjacent broad side walls and located between the center line and narrow side wall of one of said waveguides and in a region of circular polarization of the magnetic field of an electromagnetic wave of the $TE_{01}$ mode in said waveguide, a ferrite type coupling member exhibiting the gyromagnetic effect positioned in said opening and exposed to the interior of both of said waveguides, means maintaining a polarizing magnetic field through said coupling means of an intensity to produce gyromagnetic resonance of said coupling member at substantially the frequency of the electromagnetic wave to be propagated to produce coupling between said coupling member and an electromagnetic wave of the $TE_{01}$ mode in said waveguides dependent in said one of said waveguides upon the direction of said polarizing magnetic field and the direction of rotation of the circularly polarized magnetic field in said one of said guides.

4. A directional electromagnetic coupler comprising a pair of elongated waveguide structures of rectangular cross-section supported with the longitudinal axes thereof parallel and with the adjacent broad side walls parallel and overlapping, an opening through the adjacent broad side walls and located from one of the narrow walls of one of said waveguides a distance substantially equal to $$\frac{a}{\pi} \cot^{-1} \sqrt{1-(\lambda/2a)^2}$$

where $a$ is the width of the wide wall and $\lambda$ is the free space wave length of the electromagnetic wave to be propagated, a ferrite type coupling member exhibiting the gyromagnetic effect positioned in said opening and exposed to the interior of both of said waveguides, means maintaining a polarizing magnetic field through said coupling means of an intensity to produce gyromagnetic resonance at said coupling member at substantially the frequency of the electromagnetic wave to be propagated to produce coupling between said coupling member and a wave in said one of said waveguides in one direction only.

References Cited in the file of this patent
UNITED STATES PATENTS

| | | |
|---|---|---|
| Re. 23,950 | Bloch et al. | Feb. 22, 1955 |
| 1,360,462 | Stoekle | Nov. 30, 1920 |
| 2,473,274 | Bradley | June 14, 1949 |
| 2,580,678 | Hansen et al. | Jan. 1, 1952 |
| 2,641,648 | Sensiper | June 9, 1953 |
| 2,644,930 | Luhrs | July 7, 1953 |
| 2,719,274 | Luhrs | Sept. 27, 1955 |
| 2,755,447 | Engelmann | July 17, 1956 |
| 2,849,684 | Miller | Aug. 26, 1958 |
| 2,849,686 | Turner | Aug. 26, 1958 |
| 2,849,687 | Miller | Aug. 26, 1958 |

OTHER REFERENCES

Belgers et al.: "Gyromagnetic Phenomena Occurring With Ferrites," Phillips Technical Review, vol. 11, No. 11, May 1950, page 318 relied on.

Fox et al.: "Behavior and Applications of Ferrite," Bell System Technical Journal, January 1955, vol. 34, No. 1, page 74 relied on.